A. CULURIS.
MACHINE FOR CUTTING AND FORMING PLASTIC MATERIAL.
APPLICATION FILED APR. 14, 1913.
1,118,334.
Patented Nov. 24, 1914.
2 SHEETS—SHEET 1.
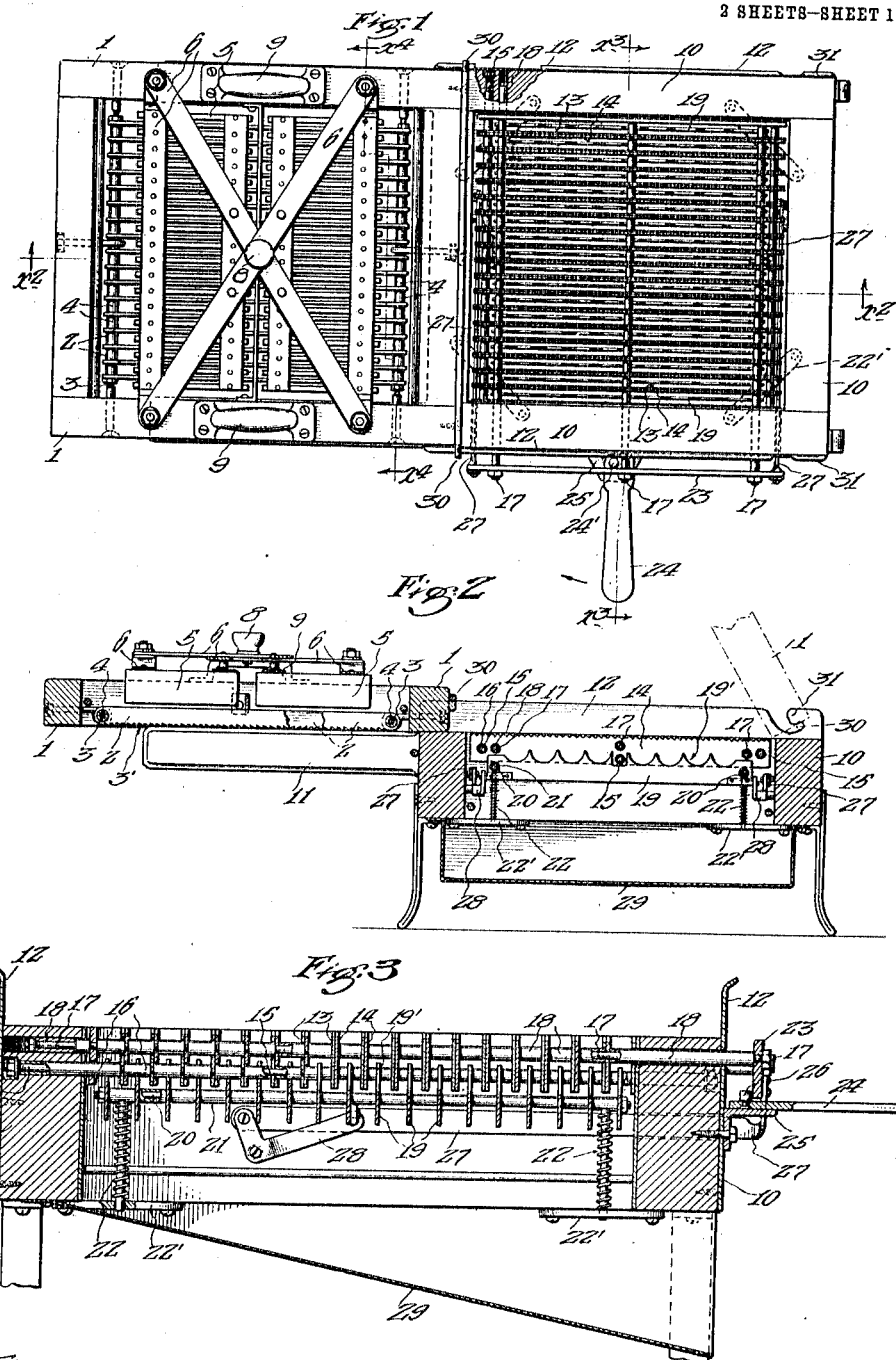

A. CULURIS.
MACHINE FOR CUTTING AND FORMING PLASTIC MATERIAL.
APPLICATION FILED APR. 14, 1913.
1,118,334.
Patented Nov. 24, 1914.
2 SHEETS—SHEET 2.
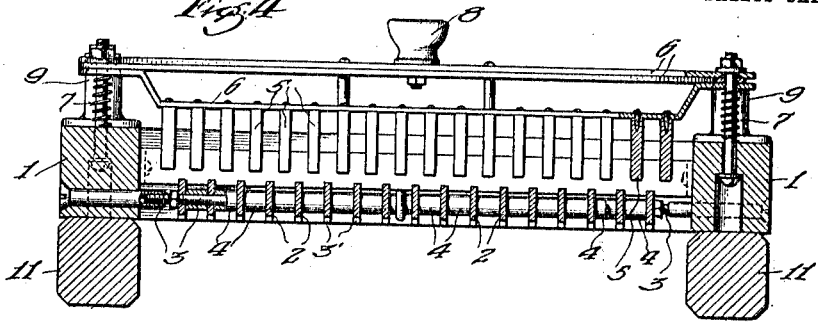
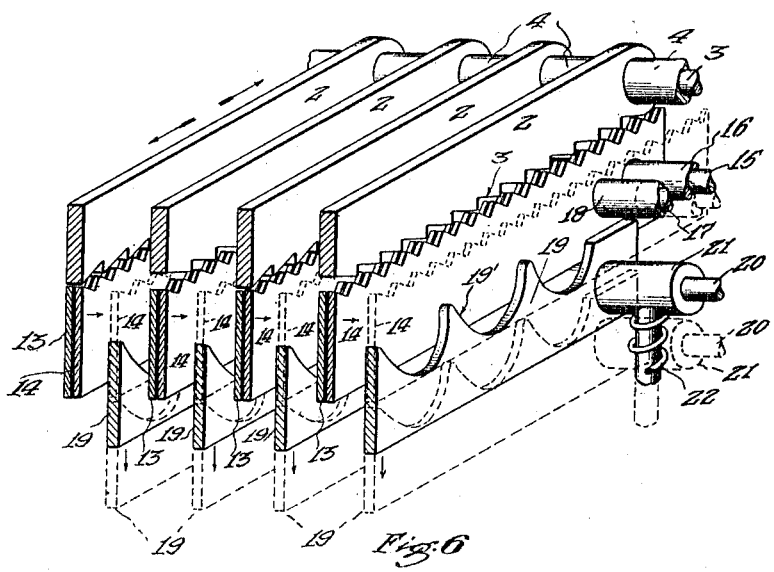
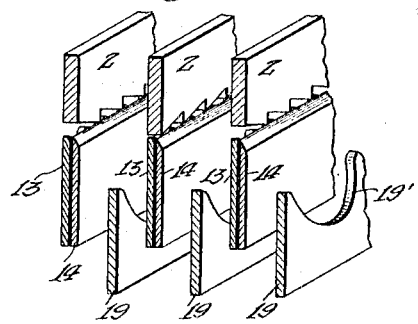

UNITED STATES PATENT OFFICE.

ANTHONY CULURIS, OF LOS ANGELES, CALIFORNIA.

MACHINE FOR CUTTING AND FORMING PLASTIC MATERIAL.

1,118,334.   Specification of Letters Patent.   Patented Nov. 24, 1914.

Application filed April 14, 1913. Serial No. 761,053.

*To all whom it may concern:*

Be it known that I, ANTHONY CULURIS, a subject of the King of Greece, (who has declared his intention of becoming a citizen of the United States,) residing at Los Angeles, in the county of Los Angeles and State of California, have invented a new and useful Machine for Cutting and Forming Plastic Material, of which the following is a specification.

My invention relates to machines for cutting and forming plastic material, such as candy and the like.

The object of my invention is to produce a machine of the above class, which can be easily operated and which will have a large and uniform output.

My invention is illustrated in the accompanying drawings.

Figure 1 shows a plan view. Fig. 2 shows a sectional elevation on line $x^2$—$x^2$ Fig. 1, looking in the direction of the arrows. Fig. 3 is a sectional elevation on line $x^3$—$x^3$ Fig. 1, looking in the direction of the arrows. Fig. 4 is a sectional elevation on line $x^4$—$x^4$ Fig. 1, looking in the direction of the arrows. Fig. 5 is a perspective detail of the cutting members and intermediate restraining means. Fig. 6 is a perspective detail showing an alternate arrangement of the lower cutting members.

My invention consists of a machine having a movable frame 1, in which are supported upper cutting members 2 consisting of a series of flat bars which are preferably provided with saw teeth 3' extending downwardly from the lower edge thereof. The upper cutting members 2 are supported by rods 3 mounted on the frame 1 and spaced apart by washers 4 placed between the respective members 2 on the rods 3.

Immediately above and intermediate to the upper cutting members 2 are ejecting members 5 consisting of two rows of smooth flat bars which are carried on a frame 6 mounted on the frame 1, the frame 6 being normally held in an upward position by springs 7. A knob 8 is provided on the frame 6 by means of which the frame 6 and the ejecting members 5 may be forced downward. Handles 9 are provided for moving the frame 1.

The frame 1 rests on a main supporting member 10 which is provided with projections 11 and guide plates 12 fixed to the opposite sides thereof. In the member 10 is supported lower cutting members 13 and 14 which may be provided with saw teeth, as shown in Fig. 5, or with a knife edge, as shown in Fig. 6, arranged along the upper edges thereof. The lower cutting members 13 are rigidly supported on a rod 15 and spaced apart by washers 16. The lower cutting members 14 are guided by the rod 15, but are rigidly clamped to rods 17 by spacing washers 18, as shown in Fig. 3.

Intermediate of the lower cutting members 13 and 14 are intermediate supporting members 19 which are supported on rods 20 and spaced apart thereon by washers 21. The rods 20 are normally held in an upward position by springs 22 mounted on brackets 22'. The upper portion of each of the intermediate members 19 has formed in it a series of approximately semicircular spaces or notches 19'.

One end of each of the rods 17 extends through the supporting member 10 and is connected to a cross bar 23. A lever 24 is pivoted on a pin 24' to a supporting bracket 25 which is fastened to the supporting member 10. The lever 24 is provided with a roller 26 so placed that when the handle is moved in a clockwise direction, as in Fig. 1, the cross bar 23 is moved away from the supporting member 10, and the lower cutting members 14 which are carried on the rods 17 are separated from the lower cutting members 13 which are rigidly connected to the frame 1. Two bars 27 are also attached to the cross bar 23 and act through bell cranks 28 to pull the rods 20 downward to the position shown by dotted lines in Fig. 5.

An apron 29 is attached to the underside of the supporting member 10 to collect and discharge the material as it comes from the cutting members above.

Pins 30 are provided on the frame 1 and hooks 31 are provided on the guide plates 12 so that the frame and the parts attached thereto may be supported in the position shown by dotted lines in Fig. 2. When supported in this position all cutting members are accessible.

The method of operation of my invention is as follows: The material to be handled is rolled into strips and placed at right angles to and upon the lower cutting members 13 and 14. The frame 1 is lifted by the handles 9 and placed upon the strips of material. The frame 1 is then reciprocated by means of the handles 9 being directed on the supporting member 10 by the guide plates 12. The upper and lower cutting members lie in the same plane, as shown in Fig. 5, and the material is separated into small lengths by the coöperation of these cutting members. The knob 8 is then pushed downward, and the material is forced from between the upper cutting members 2 into a position between the lower cutting members 13 and 14, being stopped and supported by the intermediate members 19. The lever 24 is then moved in clockwise direction, and the lower cutting members 13 and 14, which are normally close together, are separated, the material being squeezed between the moving cutting member 14 and the stationary cutting member 13 of the next pair to the right, as shown in Fig. 5. Simultaneously, the intermediate members 19 are dropped away by the action of the bars 27 and the bell cranks 28, assuming the position shown in dotted lines in Fig. 5. The lower cutting members 14, having moved in the direction of the arrow, are then immediately over the intermediate members 19. When the lever 24 is released the cutting members 13 and 14 are returned to their original position by the action of the springs 22 operating through the bell cranks 28 and the bars 27. The plastic material is supported during the period that it is being compressed by the pressure of the lower cutting members 13 and 14 between which it is gripped. When the lever 24 is released, and the pressure of the lower cutting members on the material is therefore released, the compressed material drops downwardly into the apron 29. The lever 24 and the intermediate members 19 and cutting members 14 are forced back to their original position by the springs 22 acting through the bell cranks 28 and the bars 27. The material is converted by the operations described into detached portions having flattened ends.

If, for any reason, it is desired to have access to the underside of the frame 1 and the cutting members supported thereon, the frame is hooked up in the position shown in dotted lines in Fig. 2, the pins 30 engaging the hooks 31 of the guide plates 12.

The machine above described embodying my invention is particularly designed for confectioners' use in producing candy, or similar material, which is of a plastic nature when warm and which upon cooling becomes hard, or substantially so.

What I claim is:

1. A cutting and forming machine for plastic material, comprising a supporting member, lower cutting members supported in parallel relation by said supporting member and each consisting of a double cutting blade, a movable frame, upper cutting members carried by said frame and adapted to coöperate with said lower cutting members, means for forcing divided portions of said plastic material between said lower cutting members, and means for separating the parts of double blades of said lower cutting members to form said plastic material between the blades.

2. A cutting and forming machine for plastic material comprising a supporting member, lower cutting members supported in parallel relation by said supporting member and each consisting of a double cutting blade, a movable frame, upper cutting members carried by said frame and adapted to coöperate with said lower cutting members, ejecting members normally supported by said frame intermediate of and above said upper cutting members, means for moving said ejecting members downwardly to force divided portions of said plastic material between said lower cutting members, and means for separating the parts of said double blades to form said plastic material between said blades.

3. A cutting and forming machine for plastic material comprising a supporting member, lower cutting members supported in parallel relation by said supporting member and each consisting of a double cutting blade, a movable frame, upper cutting members carried by said frame and adapted to coöperate with said lower cutting members, means for forcing divided portions of said plastic material between said lower cutting members, intermediate members for preventing said plastic material from being forced completely through said lower cutting members, means for actuating said double blades to form said plastic material, and means for retracting said intermediate members to allow said plastic material to fall away from said lower cutting members.

4. A cutting and forming machine for plastic material comprising a supporting member, lower cutting members supported in parallel relation by said supporting member and each consisting of a double cutting blade, a movable frame, upper cutting members carried by said frame and adapted to coöperate with said lower cutting members, ejecting members normally supported by said frame intermediate of and above said upper cutting members, means for moving said ejecting members downwardly to force divided portions of said plastic material between said lower cutting members, intermediate members for preventing said plastic material from being forced completely through said lower cutting members, means for actuating said double blades to form said material, and means for retracting said intermediate members to allow said plastic material to fall away from said lower cutting members.

5. In a machine for cutting and forming plastic material, a series of double knives adapted to coöperate with a second series of knives to divide the material, and means for moving the parts of said first named series to compress the divided portions.

6. In a machine for cutting and forming plastic material, a series of movable knives, a series of stationary knives coöperating with said movable knives to divide the material, each of said stationary knives composed of a fixed and a movable portion, and means for moving the movable portion of one of said stationary knives toward the fixed portion of an adjacent knife.

7. In a cutting and forming machine for plastic material, means for dividing the material, members composed of a fixed and a movable portion, means for forcing the divided portions of material between a fixed portion of one member and a movable portion of an adjacent member, means for preventing the divided portions being forced entirely through said members, and means for moving a movable portion of one member toward the fixed portion of an adjacent member.

In testimony whereof, I have hereunto set my hand at Los Angeles, California, this 8th day of April, 1913.

ANTHONY CULURIS.

In presence of—
 FRANK L. A. GRAHAM,
 LORRAINE E. DURROW.

Copies of this patent may be obtained for five cents each, by addressing the "Commissioner of Patents, Washington, D. C."